United States Patent [19]

Azusawa et al.

[11] Patent Number: 4,571,668

[45] Date of Patent: Feb. 18, 1986

[54] APPARATUS AND METHOD FOR CONTROLLING A THYRISTOR CONVERTER IN RESPONSE TO CHANGE IN MODE OF LOAD CURRENT

[75] Inventors: Noboru Azusawa; Hisayoshi Shiraishi, both of Katsuta, Japan

[73] Assignee: Hitachi, Ltd., Tokyo, Japan

[21] Appl. No.: 597,029

[22] Filed: Apr. 5, 1984

[30] Foreign Application Priority Data

Apr. 6, 1983 [JP] Japan .................................. 58-59274

[51] Int. Cl.⁴ ............................................ H02H 7/162
[52] U.S. Cl. .................................. 363/81; 318/345 C; 363/87
[58] Field of Search .......................... 363/81, 87, 129; 318/345 C, 345 E

[56] References Cited

U.S. PATENT DOCUMENTS 3,902,109  8/1975  Speth et al. ............................ 363/87
3,976,930  8/1976  Rehnman ............................... 363/81
4,490,780 12/1984  Nondahl ................................. 363/87
4,507,723  3/1985  Brackman et al. ..................... 363/87

FOREIGN PATENT DOCUMENTS 49979  4/1980  Japan .
123373  7/1983  Japan .................................... 363/87

Primary Examiner—William H. Beha, Jr.
Attorney, Agent, or Firm—Antonelli, Terry & Wands

[57] ABSTRACT

A control apparatus for a thyristor converter which supplies electric power to a load generating a changeable electromotive force, wherein, in response to a load current being changed from an intermittent load current mode to a continuous load current mode, an actual main circuit constant of the load is calculated on the basis of a pregiven main circuit constant of said load, a predetermined minimum value of a DC average motor current at which a compensation control angle is zero, a DC average load current and a set control angle at a time when the load current just changed from the intermittent load current mode to the continuous load current mode.

The compensation control angle is obtained on the basis of the calculated actual main circuit constant and the DC average load current.

The calculated compensation control angle is added to the set control angle to thereby apply the added angle to the thyristor converter as a firing control angle.

11 Claims, 19 Drawing Figures

APPARATUS AND METHOD FOR CONTROLLING A THYRISTOR CONVERTER IN RESPONSE TO CHANGE IN MODE OF LOAD CURRENT

BACKGROUND OF THE INVENTION

This invention relates to control apparatus for a thyristor converter capable of changing by firing phase control the power to be supplied to a load which generates counter electromotive force, and particularly one which can compensate for the nonlinear relation between the set firing control angle of the thyristor converter and the load voltage (or load current) and hence deterioration of the response characteristic of the thyristor converter upon intermittent current flow.

As is well known, the thyristor converter is used to drive a load which generates a counter electro-motive force, such as a DC motor, AC motor etc.

When a motor is driven by the thyristor converter, the current flowing in the thyristor converter becomes continuous and intermittent depending on the condition of the load. When the current intermittently flows in the thyristor converter, the relation between the set firing control angle of thyristor converter and the load current (or load voltage) becomes nonlinear. This deteriorates the response characteristic of the control apparatus for the thyristor converter as is well known.

In order to compensate for the deterioration of the response characteristic of the control apparatus, the use of the following method was proposed. The difference between the firing control angles upon continuous and intermittent current flow where the average voltage of DC output of thyristor converter is the same, that is, a compensation control angle, is determined, and upon intermittent current flow the compensation control angle is added to the set firing control angle determined from the phase control signal, thereby producing the actual firing control angle. Thus, the nonlinear relation between the set firing control angle and load voltage (load current) can be compensated for, and hence the response characteristic of the control apparatus can be prevented from deterioration. This nonlinear relation compensating method is disclosed in Japanese Patent Laid-open Gazette No. 49979/1980 in which the applicant was Hitachi Ltd., and which was laid-opened on Apr. 11, 1980.

According to this method, the compensation control angle must be calculated in consideration of the main circuit constant which is determined mainly by the motor. The main circuit constants of motors manufactured even according to a specification have various values. If a set main circuit constant does not agree with the actual main circuit constant, the nonlinear characteristic compensation which will be made properly upon continuous current flow will be improperly made upon intermittent current flow. If, for example, a set main circuit constant is smaller than the actual one, continuous current will be misdetected as intermittent current, thus the compensation control angle being added to the set control angle results in overcompensation. On the contrary, if a set main circuit constant is larger than the actual one, intermittent current will be misdetected as continuous current. Also, in this case, even if intermittent current condition is properly detected to be intermittent, only a small angle is added for compensation, resulting in insufficient compensation.

Under excessive compensation, the thyristor transducer will produce a small DC output voltage in responsive to the phase control signal. The reduction of the DC output voltage results in small load current. Thus, the compensation control angle for compensation becomes large, or a positive feedback condition is brought about. In case of the insufficient compensation, the nonlinear characteristic is not compensated for even upon intermittent current flow and the compensation control angle is too small even in the region in which compensation is made.

Thus, in case of excessive compensation and insufficient compensation, optimum compensation for nonlinear characteristic cannot be made, and thus the response cannot be improved.

SUMMARY OF THE INVENTION

It is an object of the invention to obviate the defect of the conventional control apparatus for a thyristor converter.

It is another object of the invention to provide a control apparatus a thyristor converter capable of optimum compensation for nonlinear characteristic in accordance with the actual main circuit constant of load.

According to an aspect of the present invention, there is provided a control apparatus for thyristor converter which supplies electric power to a load generating a changeable electromotive force, wherein, in response to a load current being changed from an intermittent load current mode to a continuous load current mode, an actual main circuit constant of the load is calculated on the basis of a pregiven main circuit constant of the load, a predetermined minimum value of a DC average motor current at which a compensation control angle is zero, a DC average load current and a set control angle at a time when the load current just changed from the intermittent load current mode to the continuous load current mode.

The compensation control angle is obtained on the basis of the calculated actual main circuit constant and the DC average load current.

The calculated compensation control angle is added to the set control angle to thereby apply the added angle to the thyristor converter as a firing control angle.

DESCRIPTION OF THE PREFERRED EMBODIMENTS

Figure 1:
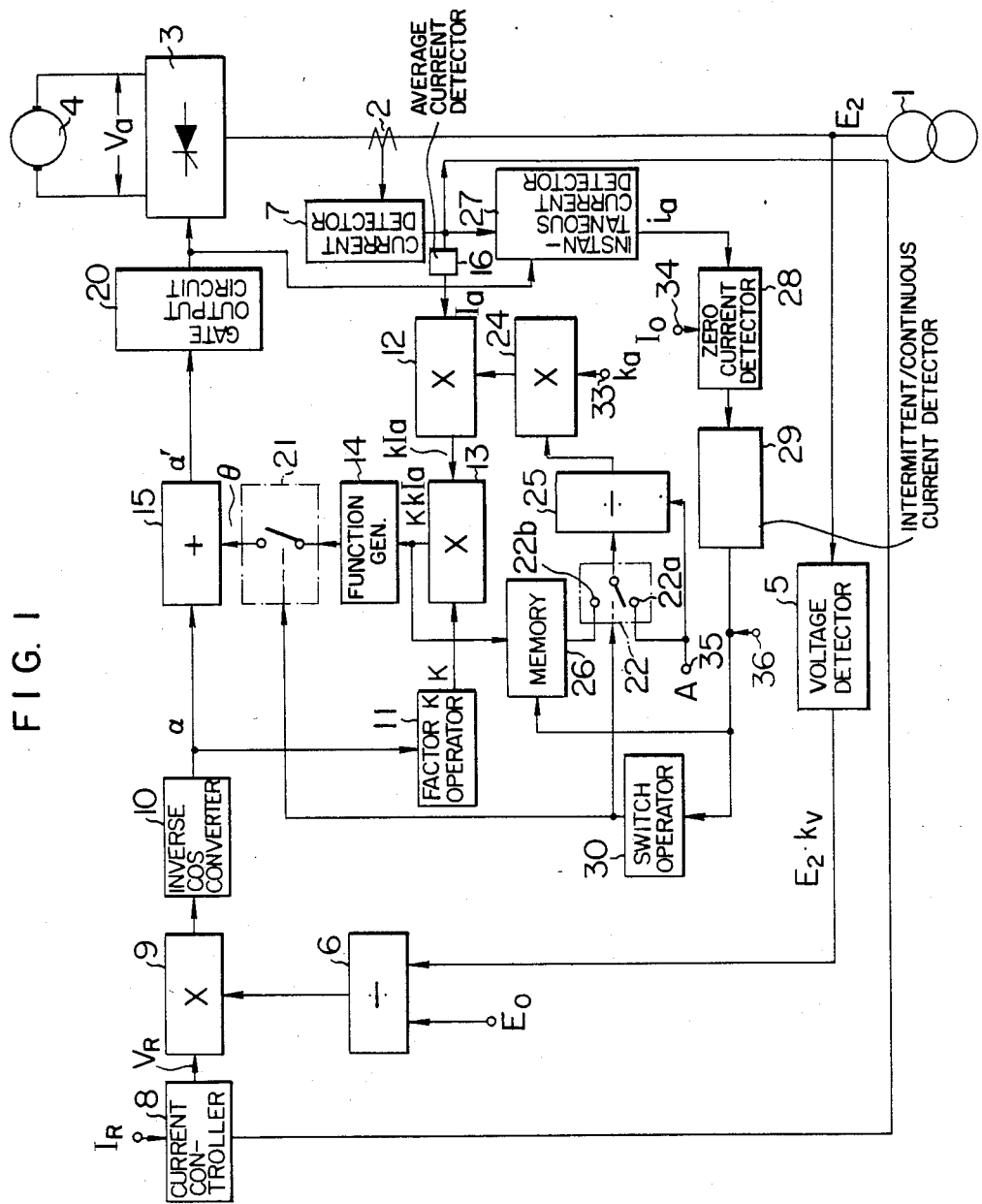
FIG. 1 is a block diagram of one embodiment of the control apparatus of the thyristor converter according to this invention.

FIG. 1 is a block diagram of one embodiment of a control apparatus for a thyristor converter according to this invention. The thyristor converter is used to drive a motor, for example, a DC motor.

Figure 2:
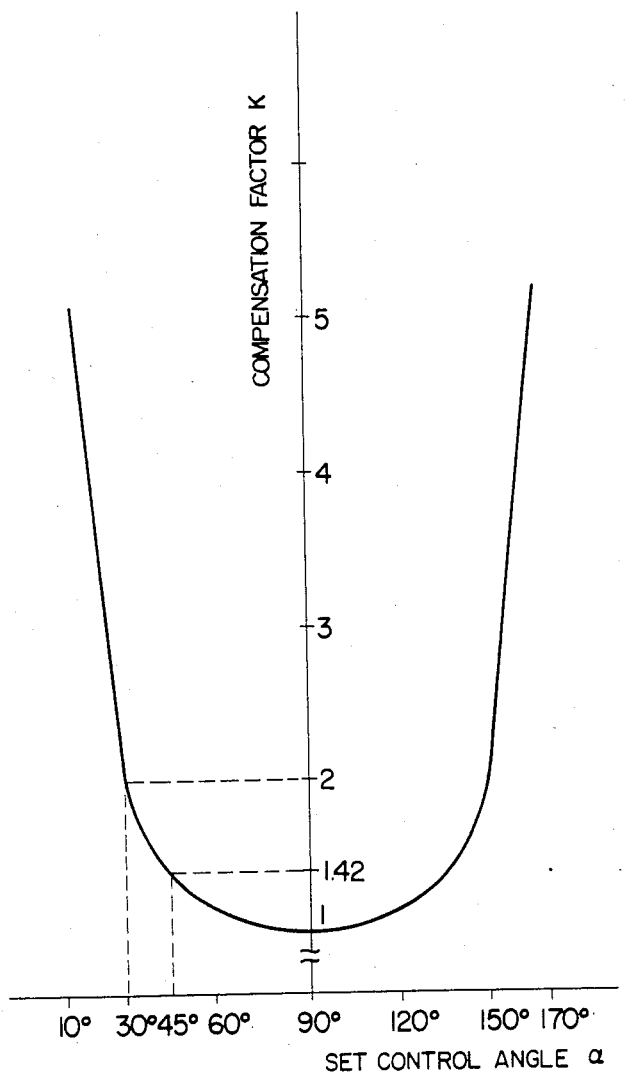
FIG. 2 shows a characteristic curve of the relation between the set firing control angle and compensation factor.

Referring to FIG. 1, there are shown a power transformer 1, a current transformer 2 for detecting the AC current from the power transformer 1, a thyristor converter 3 for converting the AC voltage of commercial frequency from the power transformer 1 to various DC voltages, a DC motor 4, a voltage detector 5 for detecting a secondary voltage $E_2$ of the power transformer 1, and a divider 6 which is responsive to the output $E_2 \cdot k_v$ ($k_v$ is a proportional constant) from the voltage detector 5 and an ideal voltage value $E_0$ of supply voltage (which is a rated voltage of supply voltage and does not change with change of load) to produce $E_0/E_2$. Also, there are shown a current detector circuit 7 for converting the output AC current from the current transformer 2 to a DC current, a current control circuit 8 for generating a control angle command value $V_R$ corresponding to the difference between a current command value $I_R$ and a current feedback value $I_a$ from the current detector circuit 7, a multiplier 9 for multiplying the output signal $E_0/E_2$ from the divider 6 by the control angle command value $V_R$, an inverse cosine converter 10 for producing a set firing control angle α by determining the inverse cosine of the $$\frac{E_0}{E_2} \cdot V_R$$

from the multiplier 9 and a compensation factor operator 11 for determining a compensation factor $k_1$, for example, shown in FIG. 2 on the basis of the set control angle α. Furthermore, there are shown an average current detector circuit 16 for detecting an average current $I_a$ from the output DC current from the current detector circuit 7, a multiplier 12 for multiplying the average current $I_a$ by a main circuit constant k which is determined by the supply voltage (or the secondary voltage of the power transformer (1) $E_2$ and the inductance L of the power supply and motor, a multiplier 13 for multiplying the output $kI_a$ of the multiplier 12 by the compensation factor K, a function generator 14 for producing the compensation control angle θ, for example, shown in FIG. 3 in response to the output $KkI_a$ of the multiplier 13, an adder 15 for adding the set control angle α and compensation control angle θ to produce actual control angle α', and a gate output circuit 20 for supplying a firing pulse to the thyristor converter 3.

The control apparatus for the thyristor converter having the above given components is capable of nonlinear compensation. That is, the compensation control angle θ is added to the set firing control angle α produced in accordance with the control angle command value $V_R$ which is proportional to the difference between the motor average current $I_a$ and current command value $I_R$, and the actual control angle α' resulting from the addition is used to control the thyristor converter 3 to turn on, thereby performing the nonlinear compensation for the relation between the $V_R$ and $I_a$ upon current interruption. Such a circuit arrangement was disclosed in Japanese Patent Laid-open Gazette No. 49979/1980, and the operation will be described later.

The control apparatus of this invention enables automatic setting of the main circuit constant by the circuit arrangement including a switch 21 for controlling the output compensation control angle θ of the function generator 14 to be applied to the adder 15, a switch 22 a movable contact of which is connected to a contact 22a when the main circuit constant is set automatically and to a contact 22b after the setting of the main circuit constant, a multiplier 24 for multiplying the output of a divider 25 by any set main circuit constant value $k_a$ applied to an input terminal 33, a memory circuit 26 for storing the output of the multiplier 13 at the time the motor current reaches a predetermined value $I_0$ representing a boundary value between intermittent and continuous values, a detector 27 for detecting the instantaneous current value $i_a$ at the firing timing of the thyristor converter from the output of the DC detector circuit 7, a detector 28 for making decision of whether the instantaneous current $i_a$ is substantially zero or not by comparing with a predetermined current value $I_0$, an interrupting/continuous current detector 29 for detecting on the basis of the output of the zero current detector 28 whether the motor current is continuous or intermittent, and a switch operation circuit 30 for controlling the switches 21 and 22 in response to the output of the intermittent/continuous current detector 29.

Before the description of this invention, we will explain the conventional control apparatus a thyristor converter having the above arrangement capable of nonlinear compensation and to which this invention is to be applied. The reason why nonlinear compensation can be made by adding the compensation control angle θ to the set control angle α when the motor current is intermittent, will be mentioned below.

The relationship among the AC voltage (secondary voltage of the power transformer (1) $E_2$ applied to the thyristor converter 3 when current is intermittent, the set control angle α and the DC output average voltage $V_d$ from the thyristor converter 3 is approximately expressed by $$V_d \approx \frac{3\sqrt{2}}{\pi} E_2 \cos\alpha \quad (1)$$

The relationship between the control angle command value $V_R$ applied to the multiplier 9 and the DC output average voltage $V_d$ is nonlinear as expressed by $$V_d \approx \frac{3\sqrt{2}}{\pi} E_2 \cos V_R \quad (2)$$

providing that $$\frac{E_0}{E_2} \cdot k_v = 1$$

and that the output of the divider 6 is 1.

The phase shift characteristic of the inverse cosine converter 10 is $\alpha = \cos^{-1} V_R$ for making the relationship between $V_R$ and $V_d$ linear. Thus, Eq. (2) can be reduced to $$V_d \approx \frac{3\sqrt{2}}{\pi} E_2 \cos(\cos^{-1} V_R) \qquad (3)$$

$$\approx \frac{3\sqrt{2}}{\pi} E_2 V_R$$

Even if the relationship between the control angle command value $V_R$ and DC output average voltage $V_d$ is attempted to be linear as above, the conversion characteristic of the thyristor converter 3 for the $\alpha$ and $V_d$ is still nonlinear when the output current is intermittent.

This will be described for three-phase thyristor converter with reference to FIGS. 4 and 5.

Figure 4:
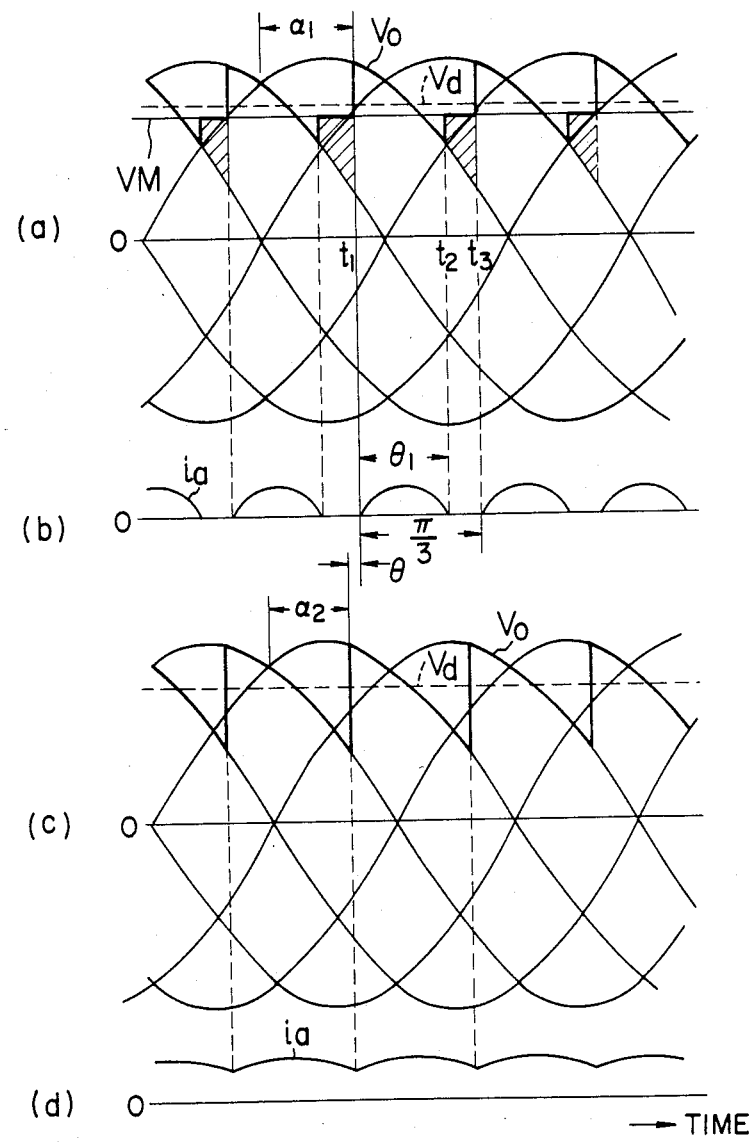
FIGS. 4(a)–(d) are waveform diagrams of motor voltage and current upon intermittent current flow and continuous current flow.

If the set firing control angle is represented by $\alpha_1$ as shown in (a) of FIG. 4, the motor current $i_a$ starts to flow at time $t_1$ and continues to flow over phase angle $\theta_1$ as shown in (b) of FIG. 4. Then, it cuts off from time $t_2$ to $t_3$, and flows at time $t_3$ as illustrated. The motor is assumed to generate induced voltage $V_M$ corresponding to the revolution rate. Thus, when current is intermittently flowed, the instantaneous DC voltage $V_0$ is induced voltage $V_M$ of the DC motor 4 in the zero current period ($\pi/3$ to $\theta_1$). Consequently, the DC average voltage $V_{d1}$ of the thyristor converter is increased by the value of the hatched area to the value shown by broken line. That is, the average DC voltage upon intermittent current flow is larger than that upon continuous current flow.

In order to generate upon continuous current flow the same average DC voltage as the average DC voltage $V_d$ upon intermittent current flow, it is necessary to select the set control angle of $\alpha_2$ as shown in (c) of FIG. 4. As illustrated, the control angle $\alpha_2$ is smaller than the control angle $\alpha_1$ upon intermittent current flow. This means that if the compensation control angle $\theta$ is $\alpha_1 - \alpha_2$, the actual control angle, upon intermittent current flow, is necessary to be made $\theta$ larger than the set control angle.

Therefore, even if the relation between the $V_d$ and $V_R$ is linearly controlled as expressed by Eq. (3), the relationship between the DC average voltage $V_d$ of the thyristor converter and the control angle command value $V_R$ becomes nonlinear.

On the other hand, as to the relationship between the control angle command value $V_R$ and DC average current $I_a$, the DC average current $I_a$ is expressed by $$I_a = \frac{V_d - V_M}{R} \qquad (4)$$

where R is the equivalent resistance of motor, and substituting Eq. (3) into Eq. (4) will yield Eq. (5):

$$I_a = \frac{\frac{3\sqrt{2}}{\pi} E_2}{R} V_R - \frac{V_M}{R} \qquad (5)$$

From Eq. (5) it will be understood that upon continuous current flow, the DC average current $I_a$ linearly changes with change of control angle command value $V_R$. However, upon intermittent current flow, the average DC voltage $V_d$ is approximately equal to the induced voltage $V_M$ during zero current flow period, for example, between time $t_2$ and $t_3$ as described above. In other words, since during the zero current flow period the power transformer 1 is electrically disconnected from the DC motor 4 by the thyristor converter 3, the average DC current $I_a$ upon intermittent current flow is smaller than upon continuous current flow. Consequently, upon intermittent current flow, the relation between the control angle command value $V_R$ and average DC current $I_a$ becomes nonlinear, as shown in FIG. 5. The relation between $V_R$ and $I_a$ is linear in the continuous current region, and shows a curve in the intermittent current region. The characteristic curves (a), (b) and (c) are for different values of induced voltage $V_M$. This means that as shown in (a) of FIG. 6, when the induced voltage $V_M$ is relatively large, the control angle $\alpha$ is reduced to $\alpha_3$ in order to increase the average voltage $V_d$, while when the induced voltage $V_M$ is relatively small, the control angle is increased to $\alpha_4$ as shown in (b) of FIG. 6, in order to decrease $V_d$. The instantaneous voltage $V_0$, at this time, bedomes as shown in FIG. 6. The instantaneous voltage $V_0$ has a small ripple when the set control angle $\alpha_3$ is small as shown in (a) of FIG. 6, but has a large value of ripple when the set control angle $\alpha_4$ is larger ($\alpha_4 > \alpha_3$) as shown in (b) of FIG. 6. Therefore, when the induced voltage $V_M$ is decreased, the motor current $i_a$ continues to flow during $\pi/3$ period of time, and hence the average DC current $I_a$ becomes large.

Figure 5:
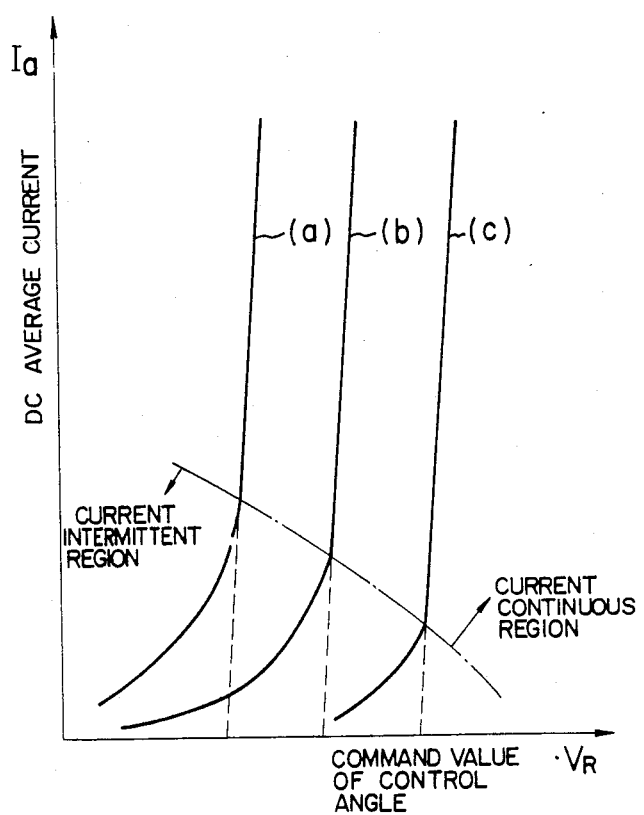
FIG. 5 shows characteristic curves of the relation between control angle command value and motor DC current.
Figure 6:
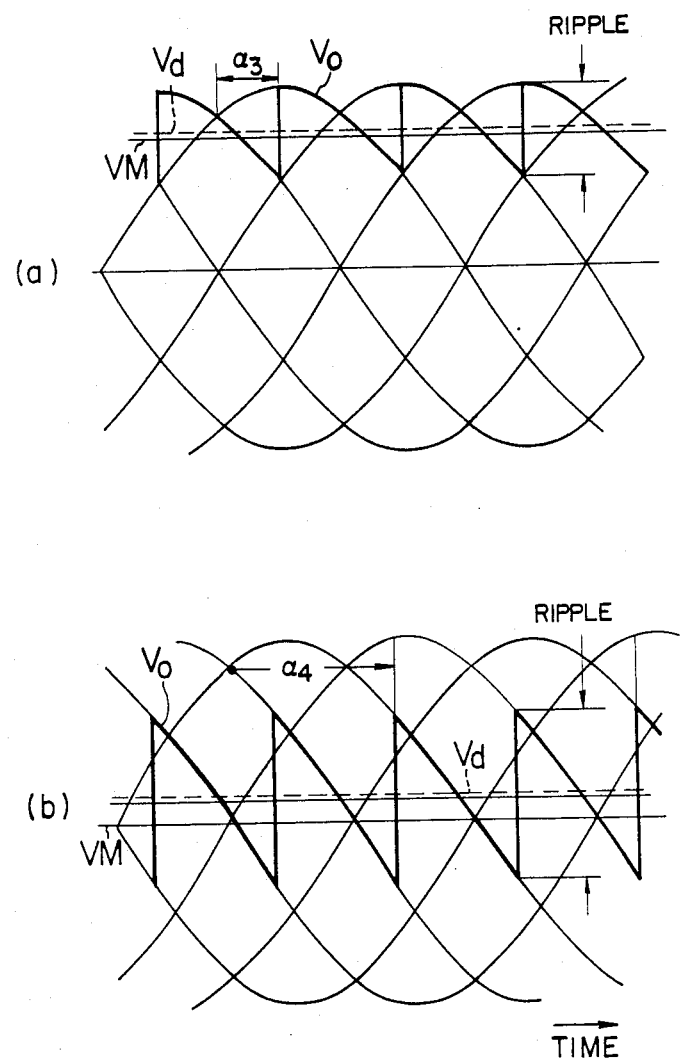
FIGS. 6(a) and (b) are waveform diagrams of motor voltage and current.

As shown in FIG. 5, the gain of the average DC current $I_a$ with respect to the control angle command value $V_R$ suddenly decreases when the motor current is intermittent.

As shown in FIG. 4, the control angle $\alpha_1$ where a certain DC average voltage $V_{d2}$ is produced upon intermittent current flow, and the control angle $\alpha_2$ where the same DC average voltage $V_{d2}$ is produced upon continuous current flow have the relation of $\alpha_2 = \alpha_1 - \theta$.

The compensation control angle $\theta$ is given by $$\theta = \psi - \frac{\pi}{3} - \delta \qquad (6)$$

where $\psi = \tan^{-1} L/R$

The $\delta$ in Eq. (6) is the current flow angle of the thyristor converter and determined by the following equation, providing that the $\delta$ is effective for positive $\theta$, and zero for negative $\theta$:

$$\frac{V_d - RI_a - L\frac{dI_a}{dt}}{\sqrt{2E_2}} = \frac{R}{\sqrt{R^2 + (\omega L)^2}} \times \frac{\sin\left(\alpha + \frac{\pi}{3} - \psi + \delta\right) - \sin\left(\alpha + \frac{\pi}{3} - \psi\right) \cdot \exp\left(-\frac{R}{\omega L}\delta\right)}{1 - \exp\left(-\frac{R}{\omega L}\delta\right)} \qquad (7)$$

Figure 7:
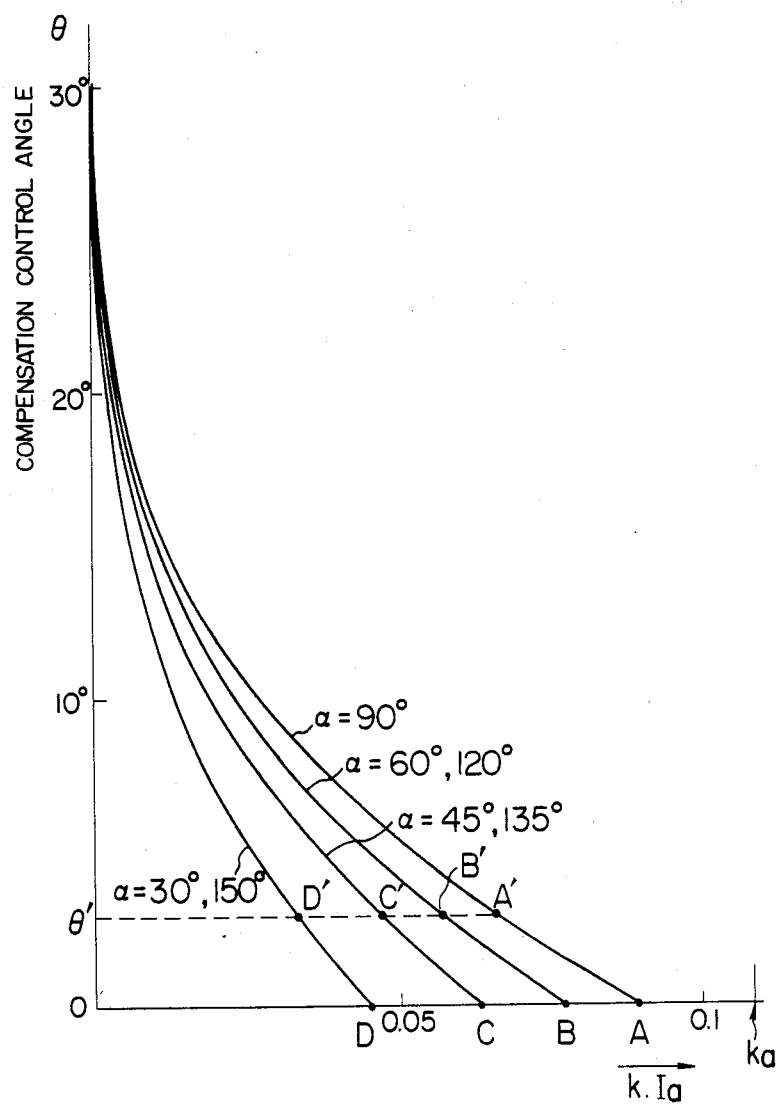
FIG.7 shows characteristic curves of the relation between the compensation control angle and motor current for different set control angles upon intermittent current flow.

In Eq. (7), $E_2$, R, $\omega$ and L are constants. Thus, the compensation control angle $\theta$ is dependent upon the average DC current $I_a$ and set control angle $\alpha$ as shown in FIG. 7. The values of $kI_a$ and $\theta$ in FIG. 7 are examples in a certain motor.

That is, the DC average voltage $V_d$ is given as $$V_d \approx \frac{3\sqrt{2}}{\pi} E_2 \cos(\alpha - \theta) \qquad (8)$$

Therefore, when the motor current is intermittent, the actual control angle $\alpha'$ is determined by adding the set control angle $\alpha$ to the compensation control angle $\theta$ for the motor current $I_a$ and set control angle $\alpha$. Thus, the average DC voltage $V_d$ is expressed as $$V_d = \frac{3\sqrt{2}}{\pi} E_2 \cos(\alpha' - \theta) \qquad (9)$$

$$= \frac{3\sqrt{2}}{\pi} E_2 \cos(\alpha + \theta - \theta) = \frac{3\sqrt{2}}{\pi} E_2 \cos\alpha$$

As a result, the relation between the control angle command value $V_R$ and average DC voltage $V_d$ agrees with Eq. (2); that is, the gain characteristic of $I_a$ to $V_R$ upon intermittent current flow can be made equal to that upon continuous current flow.

From the above expression it will be understood that the nonlinear characteristic of $I_a$ to $V_R$ can be compensated for by adding the compensation control angle $\theta$ to the set control angle $\alpha$ upon intermittent current flow. When $$\frac{E_0}{E_2} \cdot k_v \neq 1$$

unlike the previous case of $$\frac{E_0}{E_2} \cdot k_v = 1,$$

the DC average voltage $V_d$ expressed by Eq. (9) is given by $$V_d \approx \frac{3\sqrt{2}}{\pi} E_2 \cdot \cos\alpha \qquad (10)$$

$$\approx \frac{3\sqrt{2}}{\pi} E_2 \cdot \frac{E_0}{E_2} \cdot V_R$$

$$\approx \frac{3\sqrt{2}}{\pi} E_0 \cdot V_R$$

because $$\cos\alpha = \frac{E_0}{E_2} \cdot V_R.$$

Thus, even if the secondary voltage $E_2$ of the power transformer 1 is changed with the change of load or supply voltage, the DC average voltage $V_d$ is not changed, but the set control angle $\alpha$ is automatically changed in proportion to the control angle command value $V_R$. Consequently, the DC average voltage $V_d$ can be kept constant irrespective of change of voltage $E_2$.

Nonlinear compensation operation performed by the control apparatus of FIG. 1 will be described about its operation.

The switch operation circuit 30 makes the switch 21 closed after the setting operation of the main circuit constant. In this state, the function generator 14 produces an output as follows.

Figure 3:
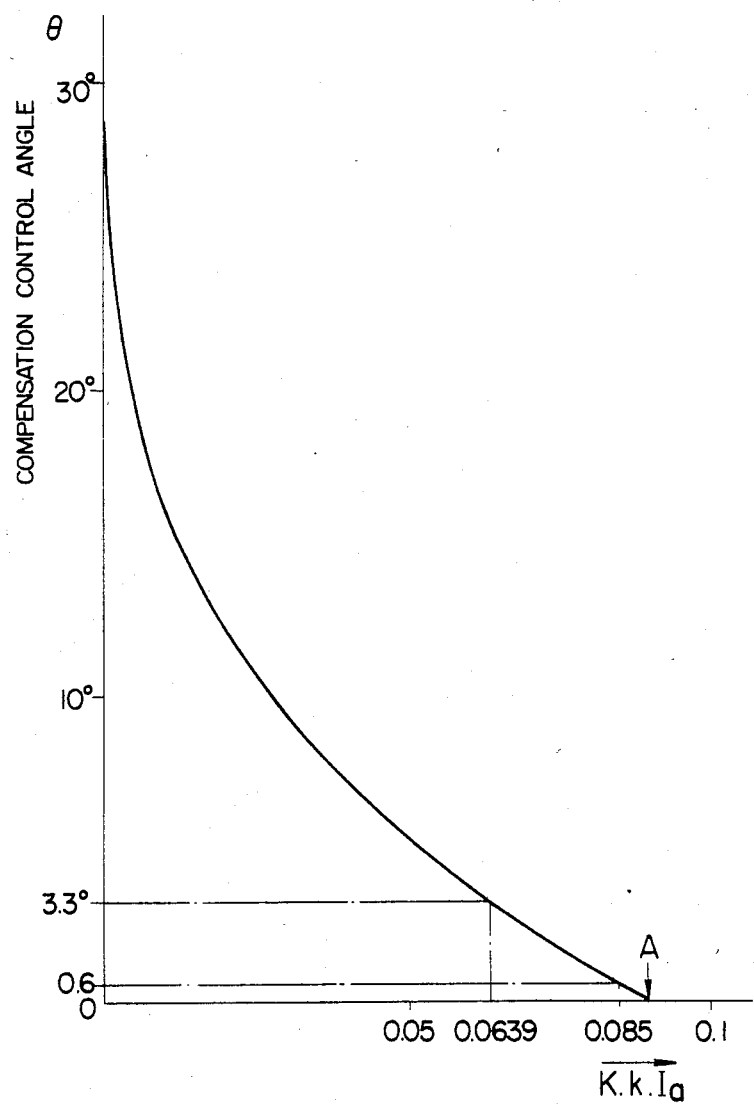
FIG. 3 shows a characteristic curve of the compensation control angle.

In the compensation control angle curves for different control angles $\alpha$, the values A, B, C and D of current $kI_a$ for zero of the compensation control angle $\theta$ and the values A', B', C' and D' of current $kI_a$ for arbitrary values $\theta'$ of the compensation control angle $\theta$ have the relationships of A/D=A'/D', A/C=A'/C', and A/B=A'/B'. Thus, when the set control angle $\alpha$ is different from 90°, the current value $kI_a$ is multiplied by the coefficient for control angle $\alpha$, or compensation factor K such as A/D, A/C, and A/B, so that the characteristic of the compensation control angle $\theta$ to current value $kI_a$ for arbitrary control angle can be made coincident with that for $\alpha=90°$. In other words, when the $kI_a - \theta$ characteristic for $\alpha=90°$ shown in FIG. 7 is used as a reference, the compensation factor K for the $kI_a - \theta$ characteristic for arbitary compensation control angle $\theta$ is determined from, for example, the curve of FIG. 2. FIG. 3 shows the same $kI_a - \theta$ characteristic for $\alpha=90°$ as in FIG. 7.

Consequently, when it is desired to determine the compensation control angle $\theta$ at a current value of $kI_a$ for arbitrary set control angle, the compensation factor K for arbitrary control angle $\alpha$ is first determined from the curve of FIG. 2, the current value $kI_a$ is multiplied by this K to produce $KkI_a$, and then the compensation control angle $\theta$ at this value $KkI_a$ is determined from the curve of FIG. 3.

Now, when thyristor converter is driven under the condition that as intermittent current value $kI_a$ is 0.06 and the set control angle $\alpha$ is not more than 40 degrees, the actual control angles $\alpha'$ for set control angles $\alpha=30°$ and 45° will be determined. Since the compensation factor K for $\alpha=30°$ is 2.0 as shown in FIG. 2, $KkI_a$ is determined as $KkI_a=0.06\times2.0=0.12$ Thus, the compensation control angle $\theta$ is obtained to be zero from FIG. 3, and hence $\alpha40 = \alpha$. The factor K for $\alpha=45°$ is obtained to be 1.42 from FIG. 2 and $KkI_a$ is 0.085. Thus, the compensation control angle $\theta$ is 0.6 as shown in FIG. 3 and hence $\alpha40 = \alpha + \theta = 45.6°$.

When the thyristor converter is driven under the condition that an intermittent current $kI_a$ is 0.045 and the set control angle $\alpha$ is not more than 30°, the compensation factor K for $\alpha$32 30° is obtained to be 2.0 from FIG. 2 and thus $KkI_a$ is $0.045\times2.0=0.09$. The compensation control angle $\theta$ is zero from FIG. 3. In this case, since the factor K for $\alpha=45°$ is obtained to be 1.42 from FIG. 2, $KkI_a=0.0639$ and thus $\theta=3.3°$ from FIG. 3. Accordingly, the control angle after correction, or the actual control angle $\alpha'$ is equal to $\alpha$, or 30° at $\alpha=30°$ and $\alpha'$ is 48.3° at $\alpha=45°$ because $\theta=3.3°$.

While the compensation control angle $\theta$ for any set control angle is determined with respect to $\alpha=90°$ as described above, another set control angle except 90° may be used as a reference, in which case the characteristic curves of FIGS. 2 and 3 are replaced by necessary ones based on the curves of FIG. 7.

In this way, the compensation control angle $\theta$ for set control angle $\alpha$ and current $KkI_a$ is calculated and the control angle after correction, or actual control angle $\alpha'$ is determined from $\alpha'=\alpha+\theta$. If this angle $\alpha'$ is a control angle upon interruption, the increment of $\theta$ allows the average DC voltage $V_d$ to be decreased by the average voltage value of the hatched area in (a) of FIG. 4. Therefore, the increment of average DC voltage caused upon intermittent current flow is cancelled out, with the result that the average voltage $V_d$ for set control angle $\alpha$ at the motor current intermittent state becomes equal to that at the motor current continuous state. In other words, upon intermittent current flow the same $V_R - V_d$ characteristic as upon continuous current flow is achieved, resulting in no deterioration of response of the control apparatus.

Description will be made of the control apparatus of the invention in which the main circuit constant k of the motor is automatically set at the start of motor, or upon driving test of motor or periodical test thereof. Following explanation will be made for case where the main circuit constant is set at the start of motor. FIG. 1 generally shows a typical embodiment of the control apparatus for thyristor converter according to this invention in which this invention is applied to the arrangement capable of compensation for nonlinear characteristic. The circuit arrangement of blocks 21 to 35 of the invention is provided for automatic setting of main circuit constant.

The setting operation for main circuit constant will be described with reference to FIG. 1. Upon setting of main circuit constant, the DC motor is actually driven and the switch 21 is opened by a low level output of the switch operation circuit 30.

Since the switch 21 is opened, the compensation control angle $\theta$ is not added to the set control angle $\alpha$ in the adder 15. The change-over switch 22 is operated by the low-level output of the switch operation circuit 30 so that its movable contact is connected to terminal 22a. To the terminal 22a is connected to a terminal 35 to which is applied, for example, the minimum value of $kI_a$ for $\alpha = 90°$ and compensation control angle $\theta = 0$, or the minimum value of $kI_a$ for arbitrary control angle $\alpha$ and compensation control angle $\theta = 0$, that is, a current value shown in FIG. 3 at point A.

Figure 8:
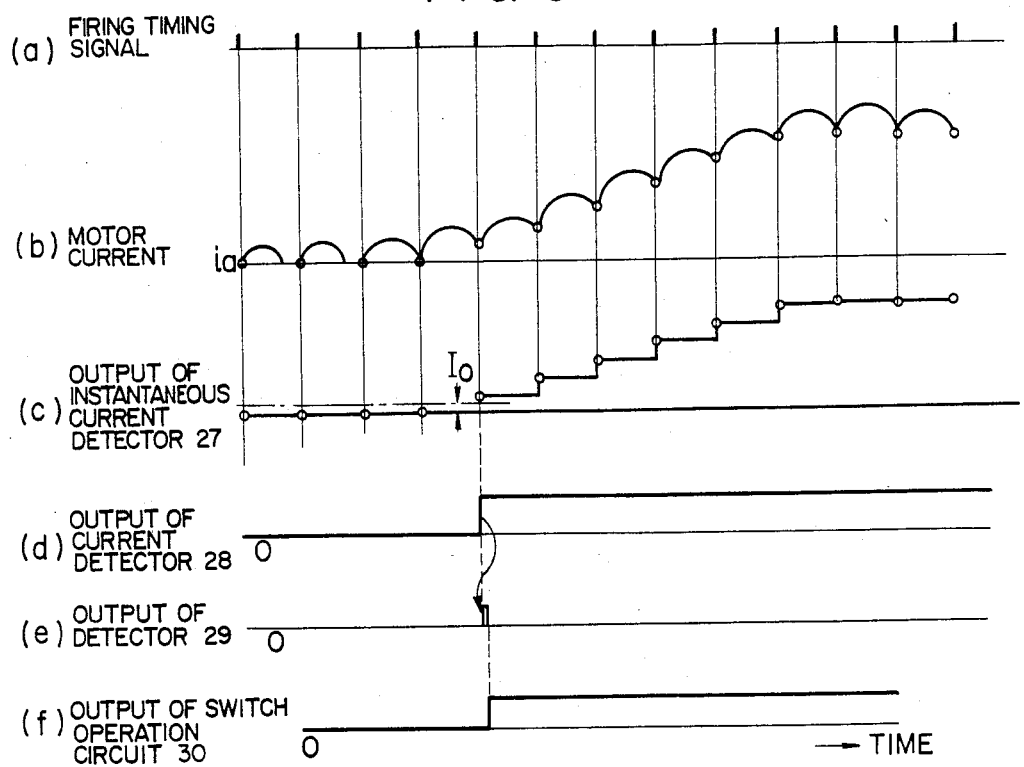
FIGS. 8(a)–(f) are waveform diagrams of waveform at each portion in the arrangement of FIG. 1.

Under this condition, as shown in (b) of FIG. 8, the motor current $i_a$ is gradually increased and drives the thyristor converter until the current $i_a$ becomes continuous from intermittent condition. At this time, in order to detect the intermittent or continuous condition of motor current, the instantaneous current detector 27 detects the instantaneous value of the motor current when the gate output circuit 20 produces a firing timing signal ((a) of FIG. 8). In other words, the instantaneous current detector 27 responds to the firing timing signal to produce the motor current $i_{a(n)}$ as shown in (c) of FIG. 8. The zerocurrent detector 28 is supplied with the output instantaneous current value $i_{a(n)}$ from the detector 27 and detect whether or not it is smaller than a predetermined value $I_0$ of nearly zero applied to the input terminal 34. The zero-current detector 28 delivers a low-level signal when the instantaneous current value is not larger than the predetermined value $I_0$. When the instantaneous current value is larger than the predetermined value $I_0$, (the instantaneous current value in this case is referred to $i_{a(n+1)}$), the zero-current detector 28 produces, for example, a high-level signal as shown in (d) of FIG. 8. The intermittent/continuous state detector 29 is responsive to this high-level output signal at its leading edge to produce a pulse shown in (e) of FIG. 8. The switch operation circuit 30 produces, for example, a high-level signal shown in (f) of FIG. 8 slightly after the leading edge of the output pulse from the detector 29. Then, the switch 21 is closed in response to the high-level output from the switch operation circuit 30, so that the movable contact of the switch 21 is connected to the terminal 22b.

Immediately before the motor current is changed from intermittent to continuous state, or just before the intermittent/continuous current detector 29 produces a pulse signal, the movable contact of the switch 22 is connected to the terminal 22a. Since the divider 25 divides the input A from the terminal 35 by the output from the switch 22 to produce an output signal of $A \div A = 1$. Since an arbitrary value $k_a$ is applied to the terminal as an initial value of the main circuit constant k, the multiplier 24 produces $1 \times k_a = k_a$. Consequently, the multiplier 12 multiplies the average DC current $I_{a(n)}$ from the average current detector circuit 16 by the output $k_a$ from the multiplier 24 to produce $k_a I_{a(n)}$, which is then supplied to the multiplier 13. The multiplier 13 multiplies the output $k_a I_{a(n)}$ from the multiplier 12 by the compensation factor $K_{(n)}$ to produce $K_{(n)} k_a I_{a(n)}$. The output of the multiplier 13 is not stored in the memory 26 in the intermittent state. The output value $K_{(n+1)} k_a I_{a(n+1)}$ of the multiplier 13 is stored in the memory 26 in response to the output pulse produced from the intermittent/continuous current detector 29 when the motor current is changed from intermittent to continuous state (a compensation factor and an average DC current at this time are $K_{(n+1)}$, $I_{a(n+1)}$). Just after the value of $K_{(n+1)} k_a I_{a(n+1)}$ is stored in the memory 26, the movable contact of the switch 22 is connected to the terminal 22b in response to a high-level output signal from the switch operation circuit 30. The switch operation circuit 30 includes a delay circuit which delays the output pulse from the intermittent/continuous current detector 29 by a slight time, and thus produces its high-level output signal a slight time after being supplied with the pulse from the detector 29.

Therefore, the value $K_{(n+1)} k_a I_{a(n+1)}$ from the memory 26 is applied through the switch 22 to the divider 25, which then produces output of $$\frac{A}{K_{(n+1)} k_a I_{a(n+1)}}.$$

Thus, the multiplier produces output of $$\frac{A}{K_{(n+1)} k_a I_{a(n+1)}} \times k_a = \frac{A}{K_{(n+1)} I_{a(n+1)}}.$$

Where A is the minimum value of $kI_a$ at which the compensation control angle $\theta$ becomes zero for the set control angle $\alpha = 90°$. Now, instead of A, the minimum value of $KkI_a$, at which the compensation control angle $\theta$ becomes zero for arbitrary control angle $\alpha$ except for 90°, may be used. Therefore, when the actual main circuit constant k is $k_1$, the value of A is $K_{(n+1)} k_1 I_a(n+1)$ ($K=1$ for 90° of $\alpha$).

Thus, the output of the multiplier 24 is given by $$\frac{A}{K_{(n+1)} I_{a(n+1)}} = \frac{K_{(n+1)} k_1 I_{a(n+1)}}{K_{(n+1)} I_a(n+1)} = k_1$$

In other words, the output of the multiplier 24 is automatically set to the actual main circuit constant. Thus, once the constant $k_1$ is set, the multiplier 24 delivers $k_1$ thereafter since the movable contact of the switch 22 is continuously thrown to the contact 22b thereafter. Therefore, the multiplier 14 delivers an angle $\theta$ corresponding to a value $Kk_1 I_a$ thereafter. After the main circuit constant is established, the thyristor transducer is driven at a proper control angle $\alpha'=\alpha+\theta$ according to the current command value $I_R$.

According to this invention, since the main circuit constant is automatically set to the actual value at the start of operation, there is no defect that the positive feedback region is caused by the overcompensation based on the error of the main circuit constant as in the prior art. Also, it is not necessary to manually establish the main circuit constant according to motor at each state of operation, and the nonlinear characteristic can always be compensated properly upon intermittent operation.

The main circuit constant may not be set at each start of motor but set at the driving test of motor or periodical test thereof. In this case, there is no necessity of setting the main circuit constant at the start of engine but the motor is driven by using the constant which has been set at the driving test or periodical test of motor and stored in the memory. In order to drive the motor by using the constant stored in the memory without setting it, a same pulse as the highlevel output pulse from the detector 29 is applied to the memory 26 and the circuit 30 from a terminal 36 at the start of motor so as to apply the data $K_{(n+1)}k_a I_{a(n+1)}$ in the memory to the divider 25.

Figure 9:
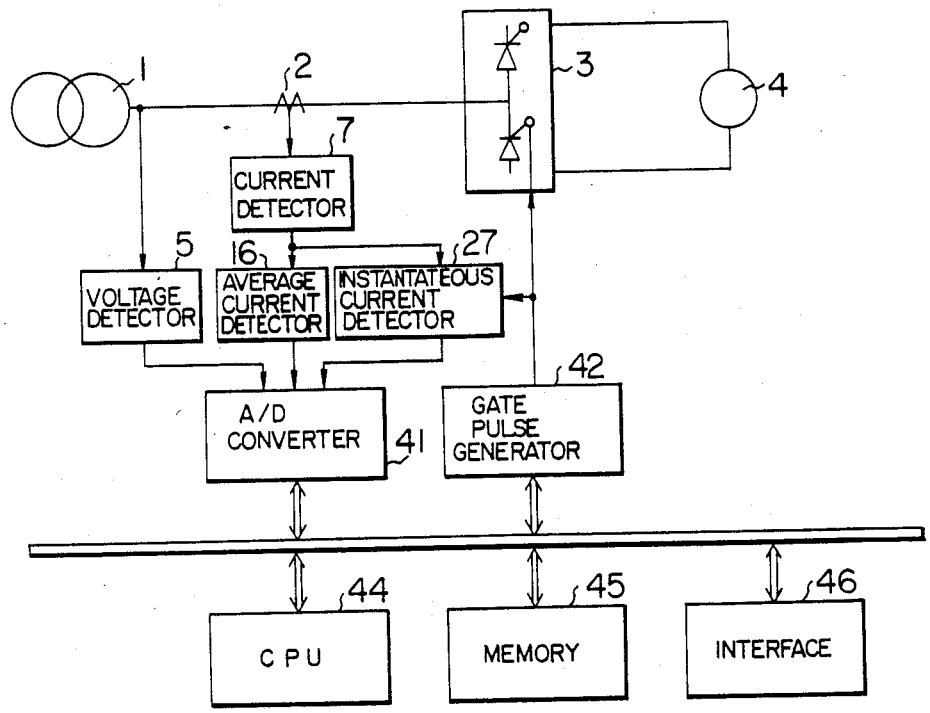
FIG. 9 is a block diagram of another embodiment of this invention.

FIG. 9 is a block diagram of another embodiment of this invention in which a microcomputer is used to process the above-mentioned operation of the control apparatus shown in FIG. 1. In FIG. 9, like elements corresponding to those of FIG. 1 are identified by the same reference numerals, and will not be described. Referring to FIG. 9, there are shown an A/D converter 41 for converting the analog values of the current average value $I_a$ from the average current detector circuit 16, the current instantaneous value $i_a$ from the instantaneous current detector circuit 27, and the supply voltage $E_2$ from the voltage detector 5 to digital values, respectively, a gate pulse generator 42 for supplying firing pulse to the thyristor converter 3 in accordance with the calculated control angle $\alpha'$, a CPU 44 for calculating the set control angle $\alpha$ and compensation control angle $\theta$ and establishing the main circuit constant and so on on the base of the output of the A/D converter 41 and the current command value $I_R$ supplied through an interface 46, and a memory 45 for storing the output from the A/D converter 41, the input data from the interface 46 and the characteristics of FIGS. 2 and 3 as maps.

Figure 10:
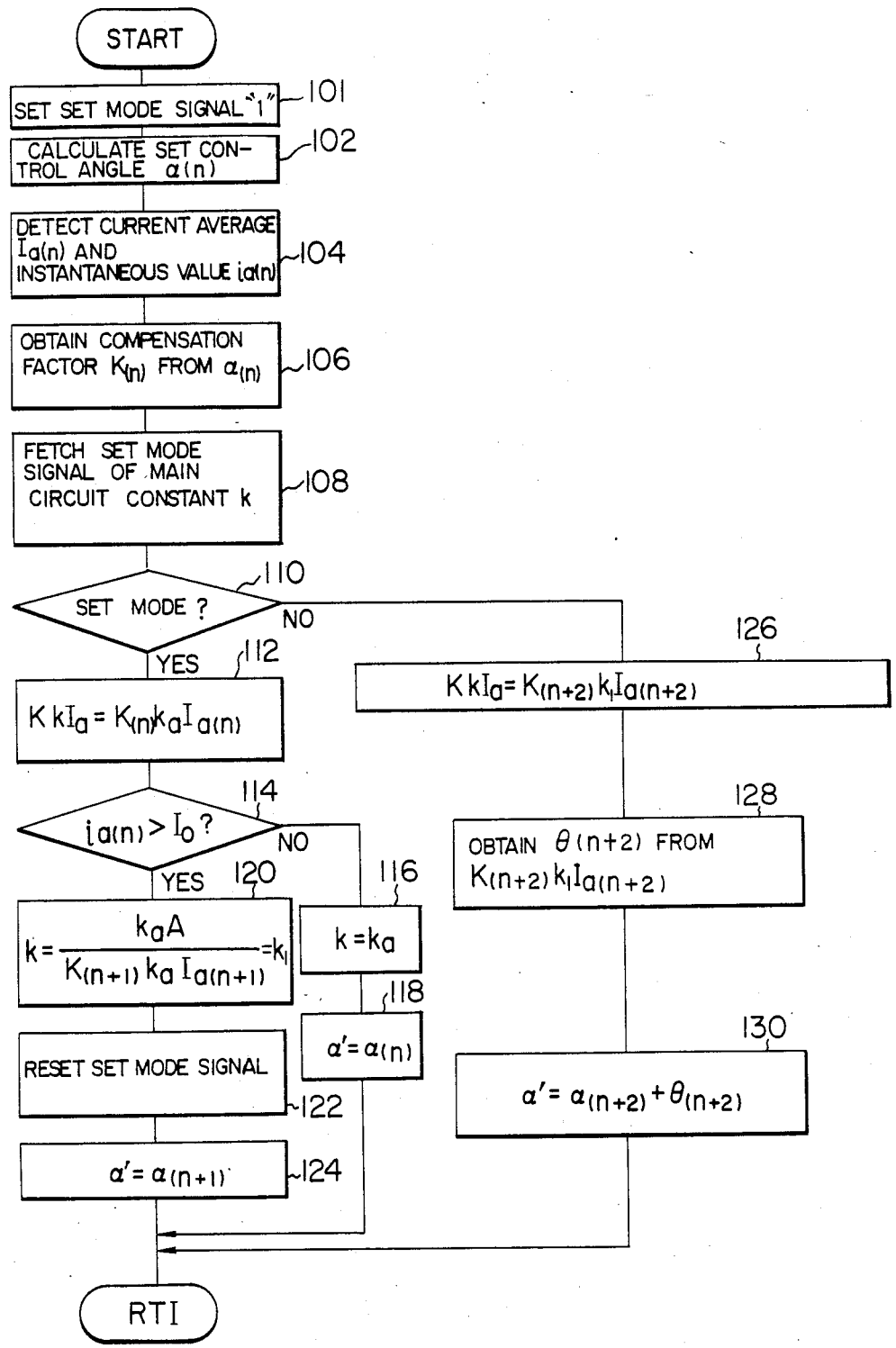
FIG. 10 is a flow chart of the operations of the embodiment of FIG. 9.

FIG. 10 is a flow chart of the operations for nonlinear compensation calculation and establishment of main circuit constant in the arrangement of FIG. 9. In this embodiment, the main circuit constant is set at each start of the motor.

Referring to FIG. 10, at step 101 at the start of operation, a set mode signal "1" of a main circuit constant is set in the memory 45 through the interface 46. At step 102, the control angle command value $V_{R(n)}$ is calculated on the basis of the current command value $I_{R(n)}$ applied to the interface 46 and the set control angle $\alpha_{(n)}$ is calculated on the basis of the control angle command value $V_{R(n)}$. Here, the current command value is assumed to increase gradually.

At step 104, the current average value $I_{a(n)}$ and current instantaneous value $i_{a(n)}$ are fetched in the memory from the A/D converter 41. At step 106, the compensation factor $K_{(n)}$ is determined from the set control angle $\alpha_{(n)}$ obtained at step 104, on the basis of the map stored in the memory in FIG. 2. At step 108, the set mode signal of main circuit constant k stored in the memory is read in, and at step 110, detection is made of whether the set mode signal is "1" or "0", or where it is the set mode of main circuit constant or not. Since the mode signal is "1" at the start of operation, it is decided to be set mode, so that the program advances to step 112, where the current value $KkI_a$ shown by the abscissa in FIG. 3 is obtained to be $K_{(n)}k_a I_{a(n)}$ by using $K=K_{(n)}$, $I_a=I_{a(n)}$ obtained at steps 104 and 106 and $k=k_a$. At step 114, decision is made of whether or not the instantaneous current value $I_{a(n)}$ is less than the pregiven current value $I_0$. If it is less than the value $I_0$, or if current is intermittent, the main constant k is set to be $k_a$ at step 116. That is, the main circuit constant remains at the initial value. Thus, at step 118, the control angle $\alpha'$ applied to the gate pulse generator 42 is made equal to the set control angle $\alpha_{(n)}$ obtained at step 102, or the thyristor converter is driven at compensation control angle $\theta=0$.

Then, the program goes back to step 102, where the set control angle $\alpha_{(n+1)}$ is determined from the current command value $I_{R(n+1)}$. At step 106, the compensation factor $K_{(n+1)}$ is obtained on the basis of $\alpha_{(n+1)}$. Then, since it is set mode, at step 112 the value of $KkI_a$ is set to be $K_{(n+1)}k_a I_{a(n+1)}$. At step 114, if the instantaneous current $i_{a(n+1)}$ detected at step 104 is decided to exceed the pregiven value $I_0$, or if the motor current is decided to be changed from intermittent to continuous state, the program progresses to step 120. At step 120, the value of k is calculated from $$k = \frac{k_a \cdot A}{K_{(n+1)}k_a \cdot I_{a(n+1)}}$$

by substituting the value of A into this equation. That is, since the value of A is the minimum current value (the value of A in FIG. 3) at compensation control angle $\theta=0$, or $k_{(n+1)}k_1 I_{a(n+1)}$ ($k_1$ is the actual main circuit constant), k is given by $$k = \frac{k_a \cdot K_{(n+1)}k_1 I_{a(n+1)}}{K_{(n+1)}k_a I_{a(n+1)}} = k_1$$

and thus the main circuit constant k coincides with the actual main circuit constant. Then, at step 122, the set mode signal within the memory is reset, or made "0". At step 124, the control angle $\alpha'$ is set to be the set control angle $\alpha_{(n+1)}$ obtained at step 102.

When setting of main circuit constant k is completed, the setting mode ends, and the normal operation mode takes place. At this time, the setting mode signal is "0".

First, at steps 102 to 106, the current average value $I_{a(n+2)}$, and the current instantaneous value $i_{a(n+2)}$ are detected, the set control angle $\alpha_{(n+2)}$ is calculated on the basis of the current command value $I_{R(n+2)}$, and the compensation factor $K_{(n+2)}$ is determined from $\alpha_{(n)}$. At steps 108 and 110, since it is determined that the operation is not of setting mode, the program goes to step 126, where $KkI_a$ is calculated. In this case, K and $I_a$ are set to be $K_{(n+2)}$ and $I_{a(n+2)}$ obtained at steps 104 and 106, respectively, and the main circuit constant k is set to be $k_1$ obtained at step 120. Therefore, $KkI_a=K_{(n+2)}k_1 I_{a(n+2)}$. At step 128, the compensation control angle $\theta_{(n+2)}$ is determined from the map of FIG. 3 on the basis of the value $K_{(n+2)}k_1 I_{a(n+2)}$.

At step 130, the compensation control angle $\theta_{(n+2)}$ is added to the set control angle $\alpha(n+2)$ obtained at step 102, producing output control angle $\alpha' = \alpha_{(n+2)} + \theta_{(n+2)}$, which is applied to the gate pulse generator.

Thereafter, when the KkI$_a$ obtained at step 126 is equal to or larger than A shown in FIG. 3, $\theta$ is set to be 0, and when it is smaller than A, the corresponding angle $\theta$ obtained from the map of FIG. 3 is added to the set control angle $\alpha$.

Thus, when the motor current is changed from continuous to intermittent mode, the set control angle is automatically corrected, or compensation for non-linearlity in the intermittent mode is made properly by calculation of control angle $\alpha'$.

In addition, since the main circuit constant k is automatically set to a proper value at the start of motor, the motor can always be controlled most properly.

While the thyristor converter drives the DC motor as in the above-described embodiment, the present invention is also applicable to a case where the thyristor converter drives a brush-less motor.

In the above embodiment, the main circuit constant is set at each the start of motor. However, it may be set not at each the start of motor but at the driving test of motor or periodical test thereof. In this case, instead of setting the set mode signal "1" at each start of motor at step 101 automatically in response to the turn on of the power source (not shown), the set mode signal "1" is set manually at step 101 upon the driving test of motor or periodical test thereof through the interface 46.

In the above described embodiments, the value A for the set control angle $\alpha=90°$ in FIG. 7 is used as a minimum current value kI$_a$ where the compensation control angle $\theta$ becomes zero. Another value minimum current value kI$_a$ except for A where the $\theta$ becomes zero such as B for the set control angle $\alpha=60°$ or 120°, for example, in FIG. 7 may be used instead of A. In this case, the characteristic curves in FIGS. 2 and 3 are modified with reference to the characteristic curves for the set control angle $\alpha=60°$ or 120° in FIG. 7.

We claim:

1. A control apparatus for a thyristor converter comprising:
    a thyristor converter for supplying electric power to a load which generates a changeable electromotive force;
    current control means for producing a control angle command value corresponding to a difference between a load current command value and a load current detected value;
    control angle calculating means for determining a set control angle for said thyristor converter on the basis of said control angle command value;
    compensation control angle producing means for determining a compensation control angle representing a correction value for said set control angle so that said thyristor converter produces the same DC average voltage upon a continuous load current mode and an intermittent load current mode;
    means for adding said compensation control angle to said set control angle to apply the added angle to said thyristor converter as a firing control angle;
    intermittent/continuous current detecting means for delivering an output signal when detecting that said load current is changed from the intermittent load current mode to the continuous load current mode; and
    main circuit constant calculating means for calculating an actual main circuit constant in response to said output signal from said intermittent/continuous current detecting means on the basis of a pregiven main circuit constant of said load, a predetermined minimum value of a DC average motor current at which said compensation control angle is zero, a DC average load current and the set control angle at a time when the load current just changed from said intermittent load current mode to said continuous load current mode, wherein
    said compensation control angle producing means obtains the compensation control angle on the basis of the calculated actual main circuit constant and said DC average load current.

2. A control apparatus for a thyristor converter according to claim 1, wherein said compensation control angle at the continuous load current mode obtained by said compensation control angle producing means is zero.

3. A control apparatus for a thyristor converter according to claim 1, wherein said intermittent/continuous current detecting means delivers said output signal when the DC average load current exceeds a predetermined value.

4. A control apparatus for a thyristor converter according to claim 3, further comprising means for selectively making said main circuit constant calculating means operable or inoperable at the start of actuating said load, wherein said main circuit constant calculating means includes a memory, said main circuit constant calculating means calculates an actual main circuit constant to thereby store the calculated main circuit constant in said memory when it is made operable and does not calculate the actual main circuit constant but delivers the calculated main circuit constant stored in said memory when it is made inoperable.

5. A control apparatus for a thyristor converter according to claim 4, wherein, when said main circuit constant calculating means is made operable at the start of actuating said load, said main circuit constant calculating means delivers said pregiven initial value before the delivery of said output signal from said intermittent/continuous current detecting means so that said compensation control angle producing means obtains a compensation control angle on the basis of said pregiven initial value and said set control angle, and said main circuit constant calculating means calculates the actual main circuit constant in response to said output signal from said intermittent/continuous current detecting means so that said compensation control angle producing means obtains a compensation control angle on the basis of said calculated main circuit constant and said set control angle after the delivery of said output signal from said current detecting means.

6. A control apparatus for a thyristor converter according to claim 4, wherein, when said main circuit constant calculating means is made inoperable, said main circuit constant calculating means delivers the calculated main circuit constant stored in said memory at the start of actuating said load so that said compensation control angle producing means obtains a compensation control angle on the basis of said calculated main circuit constant and said set control angle at and after the start of actuating said load.

7. A control apparatus for a thyristor converter according to claim 1, wherein said main circuit constant calculating means calculates the actual main circuit constant $k_1$ from an equation $$k_1 = \frac{k_a \cdot A}{K_{(n+1)} k_a I_{a(n+1)}},$$

where A shows said predetermined minimum value of said DC average load current, $k_a$ shows said pregiven initial value and $K_{(n+1)}$ and $I_{a(n+1)}$ respectively show said compensation factor and said DC average load current when said output signal is delivered from said intermittent/continuous current detecting means.

8. A method of controlling a thyristor converter for supplying electric power to a load which generates a changeable electromotive force comprising:
- a first step of obtaining a set control angle for said thyristor converter in accordance with a difference between a load current command value and a load current detected value;
- a second step of determining whether the load current is changed from an intermittent load current mode to a continuous load current mode;
- a third step of, in response to that said load current is changed from the intermittent load current mode to the continuous load current mode, calculating an actual main circuit constant on the basis of a pregiven main circuit constant of said load, a predetermined minimum value of a DC average motor current at which a compensation control angle is zero, a DC average load current and the set control angle at a time when the load current just changed from said intermittent load current mode to said continuous load current mode, said compensation control angle, a compensation control angle representing a correction value for said set control angle so that said thyristor converter produces the same DC average voltage upon the continuous load current mode and the intermittent load current mode;
- a fourth step of obtaining the compensation control angle on the basis of the calculated actual main circuit constant and said DC average load current; and
- a fifth step of adding said compensation control angle obtained at said fourth step to said set control angle obtained at step 1 to thereby deliver added control angle to said thyristor converter as a firing control angle thereof.

9. A method of controlling a thyristor converter according to claim 8, wherein said compensation control angle at the continuous load current mode obtained in said fourth step is zero.

10. A method of controlling a thyristor converter according to claim 8, wherein said second step determines that said load current is changed from the intermittent load current mode to the continuous load current mode when the DC average load current exceeds a predetermined value.

11. A method of controlling a thyristor converter according to claim 8, wherein said third step obtains the actual main circuit constant $k_1$ from an equation $$k_1 = \frac{k_a \cdot A}{K_{(n+1)} k_a I_{a(n+1)}},$$

where A shows said predetermined minimum value of said DC average load current, $k_a$ shows said pregiven initial value and $k_{(n+1)}$ and $I_{a(n+1)}$ respectively show said compensation factor and said DC average load current when said load current is just changed from said intermittent load current mode to said continuous load current mode.

* * * * *